United States Patent
Shi et al.

(10) Patent No.: US 9,810,840 B2
(45) Date of Patent: Nov. 7, 2017

(54) INTEGRATED ON-CHIP POLARIZER

(71) Applicant: Coriant Advanced Technology, LLC, New York, NY (US)

(72) Inventors: Ruizhi Shi, New York, NY (US); Thomas Wetteland Baehr-Jones, Arcadia, CA (US); Yangjin Ma, Brooklyn, NY (US); Yang Liu, Elmhurst, NY (US); Michael J. Hochberg, New York, NY (US); Matthew Akio Streshinsky, New York, NY (US)

(73) Assignee: Elenion Technologies LLC, New York, NY (US)

(*) Notice: Subject to any disclaimer, the term of this patent is extended or adjusted under 35 U.S.C. 154(b) by 0 days.

(21) Appl. No.: 14/989,436

(22) Filed: Jan. 6, 2016

(65) Prior Publication Data

US 2017/0192171 A1 Jul. 6, 2017

(51) Int. Cl.
 *G02B 6/26* (2006.01)
 *G02B 6/126* (2006.01)
 *G02B 6/122* (2006.01)
 *G02B 6/12* (2006.01)

(52) U.S. Cl.
 CPC .......... *G02B 6/126* (2013.01); *G02B 6/1228* (2013.01); *G02B 2006/12107* (2013.01); *G02B 2006/12126* (2013.01)

(58) Field of Classification Search
 CPC .................................. G02B 6/26; G02B 6/122
 USPC ......................................................... 385/11
 See application file for complete search history.

(56) References Cited

U.S. PATENT DOCUMENTS

| 6,169,825 | B1 | 1/2001 | Morey | |
| 6,804,446 | B1* | 10/2004 | Nordin | B82Y 20/00 |
| | | | | 385/125 |
| 9,448,425 | B2* | 9/2016 | Ogawa | G02F 1/025 |
| | | | | 385/11 |
| 9,500,807 | B2* | 11/2016 | Priel | G02B 6/1228 |
| | | | | 385/11 |
| 2003/0031407 | A1* | 2/2003 | Weisberg | G02B 6/023 |
| | | | | 385/28 |
| 2003/0223672 | A1* | 12/2003 | Joyner | G02B 6/12011 |
| | | | | 385/14 |

(Continued)

OTHER PUBLICATIONS

Tu et al.; "A Compact SOI Polarization Beam Splitter Based in Multimode Interferences Coupler"; downloaded from: http://proccedings.spiedigitallibrary.org/ on Jul. 21, 2014; 6 pages.

(Continued)

*Primary Examiner* — Kaveh C Kianni
(74) *Attorney, Agent, or Firm* — Nixon Peabody LLP

(57) ABSTRACT

A low loss high extinction ratio on-chip polarizer is disclosed. The polarizer includes an input waveguide taper having an outer waveguiding region that widens in the direction of light propagation along at least a portion of the taper length, and a core waveguiding region that narrows in the direction of light propagation along at least a portion of the taper length, so as to selectively squeeze out light of undesired modes into the outer regions while preserving light of a desired mode in the waveguide core. An integrated light absorber/deflector may be coupled to the outer waveguiding regions.

19 Claims, 14 Drawing Sheets

(56) References Cited

U.S. PATENT DOCUMENTS

| | | | | |
|---|---|---|---|---|
| 2004/0208447 A1* | 10/2004 | Ramadan | ............... | B82Y 20/00 385/39 |
| 2006/0193592 A1* | 8/2006 | McNie | ................... | G02B 6/266 385/140 |
| 2006/0215949 A1* | 9/2006 | Lipson | .................... | G02F 1/025 385/2 |
| 2012/0262781 A1* | 10/2012 | Price | ........................ | G02B 6/14 359/341.3 |
| 2016/0178842 A1* | 6/2016 | Goi | ........................ | G02B 6/126 385/11 |

OTHER PUBLICATIONS

Dai et al.; "Compact Polarization Beam Splitter Using an Asymmetrical Mach-Zehnder Interferometer Based on Silicon-on-Insulator Waveguides"; IEEE Photonics Technology Letters, vol. 24, No. 8, Apr. 15, 2012; 3 pages.

Su et al.; "Four-port Integrated Polarizing Beam Splitter"; Optical Society of America; (Doc. ID 201495); published Feb. 11, 2014; 4 pages.

Dai et al.; "Mode Conversion in Tapered Submicron Silicon Ridge Optical Waveguides"; Optical Society of America; vol. 20, No. 12; Jun. 4, 2012; 15 pages.

Dai et al; "Novel Concept for Ultracompact Polarization Splitter-rotator Based on Silicon Nanowires"; Optical Society of America; vol. 19, No. 11; May 23, 2011; 10 pages.

Dai et al.; "Novel Ultra-Short and Ultra-Boradband Polarization Beam Splitter Based on a Bent Directional Coupler"; Optics Express; vol. 19, No. 19; Sep. 12, 2011; 7 pages.

Muhammad Alam et al.; "Compact hybrid TM-pass polarizer for silicon-on-insulator platform"; Applied Optics, Optical Soc. Am., Washington, DC; vol. 50, No. 15, pp. 2294-2298; May 20, 2011; XP01563243; ISSN: 0003-6935 (5 pages).

Yin Xu et al.; "A Compact TE-Pass Polarizer for Silicon-Based Slot Waveguides"; IEEE Photonics Techn. Ltrs., vol. 27, No. 19, pp. 2071-2074; Oct. 1, 2015; XP055358364; ISSN: 1041-1135 (4 pages).

Ying Huang et al.; "CMOS compatible horizontal nanoplasmonic slot waveguides TE-pass polarizer on silicon-on-insulator platform"; Optics Express, vol. 21, No. 10, pp. 12790-12796; May 16, 2013; XP055358367 (7 pages).

Azzam Shaimaa I. H. et al.; "Proposal of an Ultracompact CMOS-Compatible TE-/TM-Pass Polarizer Based on SoI Platform"; IEEE Photonics Techn. Ltrs., vol. 26, No. 16, pp. 1633-1636; IEEE Service Center, Piscataway, NJ; Aug. 15, 2014; XP011554342; ISSN: 1041-1135 (4 pages).

Wang Jian et al.; "Fabrication of a new broadband waveguide polarizer with a double-layer 190 nm period metal-gratings using nanoimprint lithography"; J. Vacuum Sci. & Techn. B: Microelectronics Processing and Phenomena; Am. Vacuum Soc.; vol. 17, No. 6, pp. 2957-2960; Nov. 1, 1999; XP012007855; ISSN: 0734-211X (4 pages).

International Search Report and Written Opinion of International Searching Authority for International Application No. PCT/US2017/012589, mailed Mar. 24, 2017 (15 pages).

\* cited by examiner

US 9,810,840 B2

INTEGRATED ON-CHIP POLARIZER

FIELD OF THE INVENTION

The invention generally relates to photonic integrated circuits, and more particularly relates to an integrated optical waveguide polarizer and/or mode filter for photonic integrated circuits and related methods.

BACKGROUND OF THE INVENTION

Optical devices that are used in photonic integrated circuits (PICs), such as but not exclusively those formed in a silicon layer of a silicon-on-isolator (SOI) chip, are typically of planar geometry and operate best with light in a specific polarization state, and preferably in a fundamental mode. However, higher order waveguide modes could be excited in PIC waveguides due to various waveguide imperfections such as sidewall roughness, transitions between multimode and single mode regions, at fiber coupling, and other interactions of the optical signal with the geometry of the devices.

Generally, planar waveguides of the type conventionally used in a PIC can support modes of two orthogonal transverse polarization states, termed TE and TM, with the lower-order modes typically being better confined within the waveguide and characterized by a greater effective index than higher-order modes of the same polarization. The lowest-order modes of each polarization state are commonly referred to as the fundamental modes and denoted as TE0 and TM0, respectively.

In order to optimize PIC performance and reduce noise it is generally desired that light propagating in the PIC belongs to a fundamental mode of a particular polarization, most commonly TE0. While suppressing higher-order TE and TM modes may be effected by using sufficiently narrow waveguides that are often referred to as single-mode, such waveguides typically support the fundamental mode of both the TE and TM polarization. Hence, additional efforts may be needed to discriminate between the TE and TM light in a PIC and to suppress one of them.

One possible approach to solving this problem is to use a directional coupler or a multi-mode interference (MMI) coupler as a polarization splitter to split TE and TM modes in space and couple them into different waveguides. Directional couplers are however sensitive to variations in wavelength, which makes it difficult to achieve high TM/TE extinction ratio across a suitably wide wavelength range, for example across the entire C band. Another drawback of directional couplers is their low tolerance to fabrication inaccuracies. A drawback of using an MIMI coupler for splitting the TE and TM polarizations relates to the coupler length, which may have to be relatively big since the difference between effective indices of the TE0 and TM0 modes is typically small. Furthermore, an MMI coupler capable of splitting off the TM polarization may have a relatively high insertion loss for the TE mode. Proposed waveguide polarizers based on asymmetrical Mach-Zehnder Interferometer (MZI) and adiabatic couplers suffer from similar drawbacks, including a big device length and a relatively high insertion loss for the TE mode.

Accordingly, it may be understood that there may be significant problems and shortcomings associated with current solutions and technologies for providing a required level of suppression of light of undesired polarization and/or modes in photonic integrated circuits.

SUMMARY OF THE INVENTION

Accordingly, one aspect of the present disclosure relates to a low-loss, high extinction ratio optical waveguide polarizer that may be integrated into a PIC and that may discriminate between fundamental polarization modes that can propagate in the PIC.

One aspect of the present disclosure provides a waveguide polarizer that is formed of, or includes, a mode-selective expander (MSE) that comprises a core waveguiding region and an outer waveguiding region and is disposed to receive light of first and second modes from an input optical waveguide, wherein the core and/or outer waveguiding regions are configured to preferentially expand the light of the second mode from the core waveguiding region into the outer waveguiding region, and to propagate the first mode along the core waveguiding region for coupling into an output waveguide, so that the outer waveguiding region remains substantially absent of the first mode.

An aspect of the present disclosure provides a waveguide polarizer, comprising: an input optical waveguide capable of supporting a first mode and a second mode; an output optical waveguide; and, a mode-selective expander (MSE) extending optically between the input and output optical waveguides. The MSE comprises a core waveguiding region disposed to receive light of the first and second modes from the input optical waveguide, and an outer waveguiding region disposed alongside with the core waveguiding region in optical communication therewith, wherein the core waveguiding region and the outer waveguiding region are configured to preferentially expand the light of the second mode from the core waveguiding region into the outer waveguiding region, and to propagate the first mode along the core waveguiding region for coupling into the output waveguide, so that the outer waveguiding region remains substantially absent of the first mode. The outer waveguiding region may be greater in width than the input optical waveguide, and the core waveguiding region of the MSE may be smaller in width than the input optical waveguide along at least a portion of the MSE. The MSE may comprise an input taper section wherein the outer waveguiding region gradually widens in a direction of light propagation, and the core waveguiding region gradually narrows in the direction of light propagation. The input taper section may be optically followed by a mode squeezing section of the MSE wherein the core waveguiding region is smaller in width that the input waveguide so as to squeeze light of the second mode out of the core waveguiding region into the outer waveguiding region while allowing light of the first mode to propagate substantially within the core waveguiding region to the output waveguide.

An aspect of the present disclosure provides a photonic integrated circuit (PIC) comprising the integrated on-chip waveguide polarizer and an integrated optical device in optical communication with said polarizer. The integrated optical device in optical communication with the polarizer may be, for example but not exclusively, a photodetector, an optical modulator, an Echelle grating, an MIMI coupler, a routing waveguide, a polarization beam splitter/combiner, an integrated laser source, a grating coupler, an edge coupler, or any other optical device suitable for an integration in a PIC.

An aspect of the present disclosure provides a PIC chip comprising: an optical waveguide interconnect disposed to provide an optical connection between a first optical device and a second optical device and comprising one or more waveguide polarizers, each configured to suppress light propagating in the optical waveguide interconnect in the second mode while passing through light in the first mode, so as to reduce mode crosstalk downstream from the one or more integrated on-chip polarizers.

An aspect of the present disclosure provides a PIC comprising: an optical waveguide interconnect configured to provide an optical connection between a first optical device and a second optical device, and comprising one or more integrated waveguide polarizers, each configured to suppress light propagating in the optical waveguide interconnect in an undersized polarization mode, so as to reduce polarization and/or mode crosstalk downstream from the one or more integrated waveguide polarizers.

An aspect of the present disclosure provides a method of polarization and/or mode filtering, in a PIC chip comprising an optical waveguide capable of supporting first and second modes. The method may comprise: a) receiving light comprising first and second modes into a mode-selective expander (MSE) waveguide that comprises a core waveguiding region and an outer waveguiding region; and, b) using the MSE waveguide to preferentially expand the light of the second mode from the core waveguiding region into the outer waveguiding region, and to propagate the first mode along the core waveguiding region for coupling into an output waveguide, so that the outer waveguiding region remains substantially absent of the first mode. In one embodiment the first mode may be a mode of a first polarization, such as for example a TE mode, while the second mode may be a mode of a second polarization that is different from the first polarization, such as for example a TM mode, and the method may be used for polarization filtering and suppressing depolarization of light in a PIC.

An aspect of the present disclosure provides a method of designing a photonic integrated circuit (PIC) chip, the method comprising: a) determining a routing path in the PIC chip for an optical waveguide interconnect that is configured for routing optical signals between optical elements; and, b) disposing one or more waveguide polarizers along the routing path so that a maximum length of a contiguous section of the optical waveguide interconnect without a waveguide polarizer does not exceed a predefined maximum length. The method may further include determining said maximum length in dependence upon one or more waveguide parameters. In accordance with an aspect of the present disclosure, steps a) and b) of the method may be performed automatically by a computer executing software instructions for implementing said steps.

The foregoing and other objects, aspects, features, and advantages of the invention will become more apparent from the following description and from the claims.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION

Figure 1:
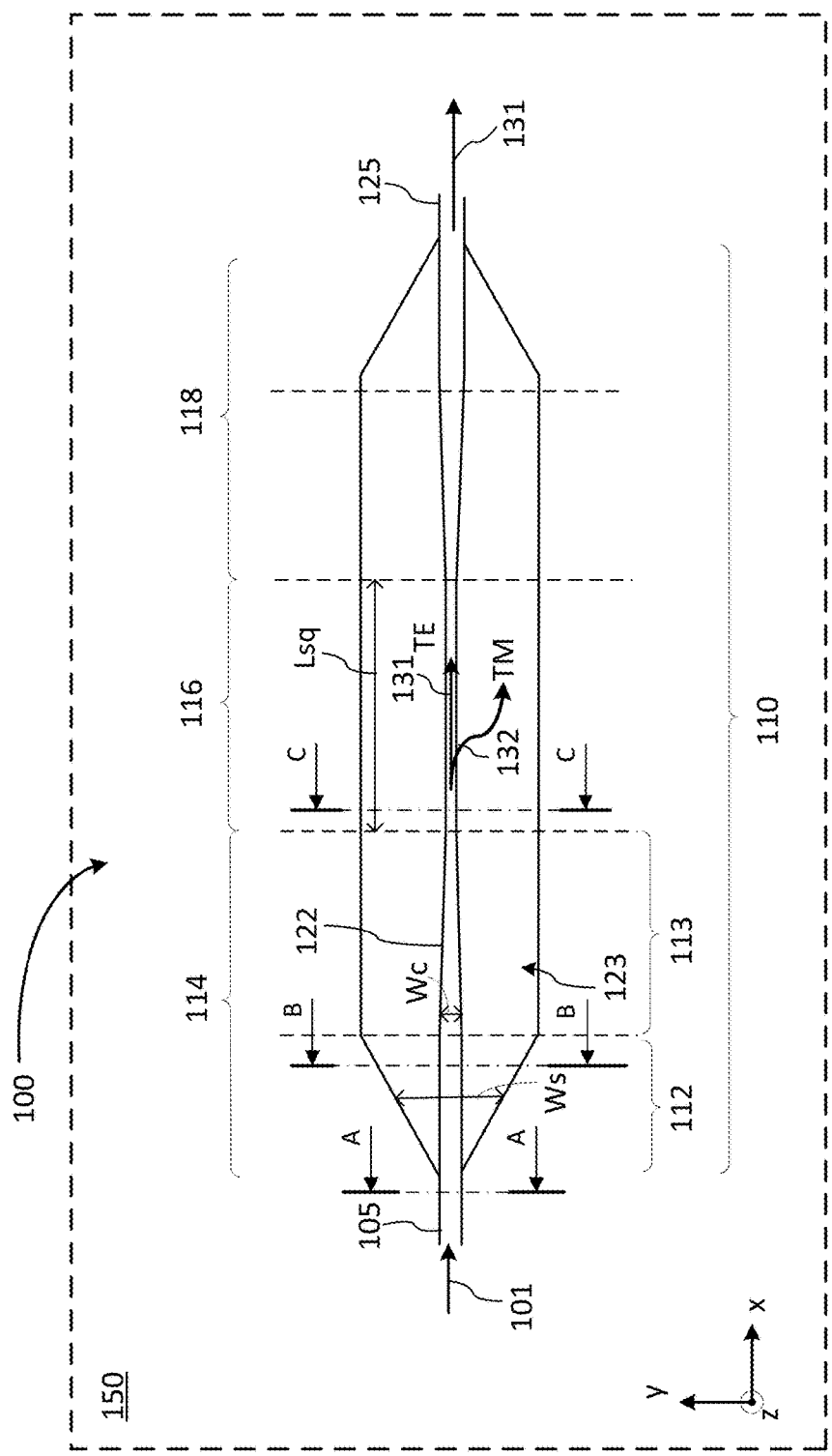
FIG. 1 is a schematic plan-view diagram of an integrated waveguide polarizer incorporating a bi-level mode-selective expander waveguide.

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:
CMOS Complementary Metal-Oxide-Semiconductor
GaAs Gallium Arsenide
InP Indium Phosphide
$LiNO_3$ Lithium Niobate
MFD Mode Field Diameter
MPW Multi Project Wafer
PIC Photonic Integrated Circuits
PSO Particle Swarm Optimization
SOI Silicon on Insulator
TE Transverse Electrical
TM Transverse Magnetic Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', when used in a description of a method or process performed by an optical device such as a polarizer or a waveguide, is to be understood as referring to an action performed by the optical device itself or by a component thereof rather than by an external agent. The term 'TE mode' refers to a waveguide mode with the direction of the electric field vector transverse, i.e. orthogonal, to the direction of light propagation. The term 'TM mode' refers to a waveguide mode with the direction of the magnetic field vector transverse, i.e. orthogonal, to the direction of light propagation. In a planar waveguide, the electric field of a TE mode may lie primarily in the plane of the waveguide, that is in the plane of a chip supporting the waveguide, while the electric field of a TM mode may lie primarily in a plane normal to the plane of the waveguide, or normal to the plane of a chip supporting the waveguide. Accordingly, TE and TM modes may also be referred as polarization modes. TE and TM modes of an n-th order are denoted as TEn and TMn, respectively, with n=0 designating a fundamental mode, so that notations TE0 and TM0 designate the fundamental TE and TM modes, respectively. The term 'higher-order mode' may refer to any non-fundamental TEn or TMn mode of the order n=1, 2, 3, . . . greater than zero, unless explicitly stated otherwise. An optical device that suppresses light of a selected mode or group of modes to a greater degree than light of another mode or group of modes may be referred to herein as a mode filter or mode throttler. An optical device that suppresses light of one polarization, for example TM or TE, to a greater degree than light of an orthogonal polarization, for example TE or TM, is referred to herein as an optical polarizer. It will be appreciated that a waveguide polarizer may also be referred to as a mode filter.

One aspect of the present disclosure relates to mode filters or polarizers that strip incoming optical signal from substantially all modes that may be present therein except for one desired mode, and let the desired mode to propagate further along an optical path substantially unaffected. Some embodiments may relate to mode filters or polarizers that strip incoming optical signal from one or more undesired modes that may be present therein, and let the desired mode to propagate further along an optical path substantially unaffected. The desired mode may be for example a fundamental TE or TM mode, but may also be a higher order TE or TM mode. Such devices are useful in many applications where a good optical beam quality is of importance. Integrated waveguide polarizers or mode filters that may be incorporated on a chip may be particularly useful in photonic integrated circuits (PIC) as means to eliminate or suppress noise due to mode crosstalk and/or polarization crosstalk that can otherwise be generated as an optical signal passes through a conventional PIC. An integrated on-chip waveguide polarizer incorporated in a PIC enables to decrease polarization crosstalk in the PIC and increase signal to noise ratio for optical signals in the PIC.

One or more example embodiments described herein relate to an integrated waveguide polarizer with ultra-low loss for light of a desired polarization mode, for example on the order of 0.05 dB or less, and a high increase in polarization extinction ratio (ER), for example on the order of 20 dB or greater, which may be advantageously used in a PIC where eliminating a TM0 mode and/or higher-order TEn modes while avoiding a loss to a TE0 mode is desired. In these embodiments, the integrated polarizer expands light that enters the polarizer in the unwanted mode into an outer waveguiding region or regions where it is then selectively eliminated, for example absorbed or diverted away from the optical path. At the same time, the desired mode, such as the fundamental TE0 mode, remains substantially confined within a core waveguiding region of the polarizer and is guided by it to an output end of the polarizer substantially without loss or with only a minimal loss in power. Generally, the waveguide polarizer described herein may be configured to pass through a desired mode while selectively suppressing any undesired mode having a lower effective index in an input waveguide and/or an output waveguide than the desired mode. The desired mode may also be referred to herein as the first mode and may be generally denoted M1, while the unwanted mode may also be referred to herein as a second mode and may be generally denoted as M2.

The first and second modes M1 and M2 may be, for example, waveguide modes of an input waveguide of the polarizer, with the first mode M1 typically characterized by a greater effective index in the waveguide. The example integrated waveguide polarizer, embodiments of which are describe hereinbelow, may be configured to pass the first mode M1 therethrough substantially without loss, while substantially blocking the second mode M2; accordingly, the first mode M1 may be referred to as the desired mode, while the second mode M2—as the undesired mode. It will be appreciated that whether a TM mode or a TE mode has the greatest effective index in a waveguide, and therefore is best confined in the waveguide core, may depend on the waveguide geometry. In one embodiment, the first mode M1 may be a fundamental TE or TM mode, while the second mode M2 may be a higher-order mode having a lower effective index than the first mode M1. In one embodiment, the first mode M1 may be a fundamental TM mode, while the second mode M2 may be a fundamental TE mode, i.e. TE0, or a higher-order TM or TE mode. In one embodiment, the first mode M1 may be a fundamental TE mode, i.e. TE0, while the second mode M2 may be a fundamental TM mode, i.e. TM0, or a higher-order TM or TE mode. In a representative embodiment, the first mode M1 may be the TE0 mode, the second mode M2 may be the TM0 mode.

With reference to FIG. 1, there is illustrated a schematic plan view of an integrated optical polarizer 100 that is configured to strip input light 101 of an undesired second mode M2 while allowing light of a desired first mode M1 to pass through the polarizer substantially without loss or with only a small loss in power. The polarizer 100 may be formed of, or include, a mode-selective expander (MSE) waveguide 110 of a variable width or widths that may be configured to selectively attenuate, or squeeze out, the light that enters the polarizer 100 in the second mode M2 while allowing the light that enters the polarizer 100 in the first mode M1 to propagate to an output 125. The MSE waveguide 110, which may also be referred to herein as the MSE 110, may be in the form of a bi-level, or generally multi-level, waveguide that has a core waveguiding region 122 of a first width We that may vary in the direction of light propagation, as indicated by an arrow 131, and an outer waveguiding region 123 adjoining the core waveguiding region 122 alongside thereof, the outer waveguiding region 123 being of a second width Ws that may also vary in the direction of light propagation. The core waveguiding region 122, which may also be referred to herein as the waveguide core 122 or simply as the core 122, is disposed to receive light 101 of the first and second modes from an input optical waveguide 105. The core and/or outer waveguiding regions 122, 123 are configured to preferentially expand the light of the second mode M2, which may have a lower effective index $n_{eff}$ than the first mode M1, from the core waveguiding region 122 into the outer waveguiding region 123, as schematically indicated by a curved arrow 132, and to propagate the first mode M1 along the core waveguiding region 122 for coupling into an output waveguide 125, as schematically indicated at 131, so that the outer waveguiding region 123 remains substantially absent of the first mode. The MSE 110 may be disposed on a PIC chip 150 as a part of a PIC. The first mode M1 may be, for example the TE0 mode of the input waveguide 105, while the second mode M2 may be a TM0 mode or a higher-order TMn or TEn mode of the input waveguide 105 having a lower effective index than the first mode. The outer waveguiding region 123 is generally greater in width than the input optical waveguide 105, while the core waveguiding region 122 of the MSE 110 may be smaller in width than the input optical waveguide 105 along at least a portion of the length of the MSE 110.

The MSE waveguide 110 may include an input taper section 114 wherein the outer waveguiding region 123 gradually widens in the direction of light propagation and the core waveguiding region 122 gradually narrows in the direction of light propagation. The input taper section 114 is optically followed by a mode squeezing waveguide section 116 wherein the core 122 remains narrower than in the input waveguide 105 along a waveguide length $L_{sq}$, with the core width Wc1 that is smaller than the core width We in the input waveguide 105. In one embodiment, the mode squeezing waveguide 116 may be followed by an output taper section 118, which may be configured to provide an adiabatic transition to an output waveguide 125 for the desired mode M1. In embodiments wherein the input waveguide 105 and the output waveguide 125 are of substantially same geometry and material structure, the output taper section 118 may mirror the input taper section 114. Embodiments may be envisioned wherein the output taper section 118 may be absent, for example when the output light 131 from the polarizer is to be coupled to a free-space optics or to a waveguide of a same core width as the width Wc1 of the waveguide core 122 in the mode squeezing waveguide 116.

FIG. 1 illustrates an example embodiment wherein the outer waveguiding region 123 gradually widens along a first length portion 112 of the input taper section 114, while the core waveguiding region 122 gradually narrows along a second length portion 113 of the input taper section 114, which follows the first length portion 112 in the direction of light propagation. In other embodiments the widening of the outer waveguiding section 123 may occur in parallel with the narrowing of the core 122, along a same length portion of the polarizer.

Figure 2:
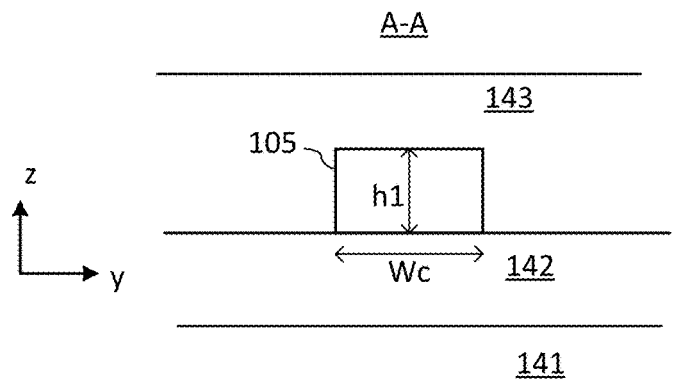
FIG. 2 is a schematic diagram of a partial cross-section of an input waveguide of the integrated waveguide polarizer of FIG. 1 in one embodiment thereof.
Figure 3:
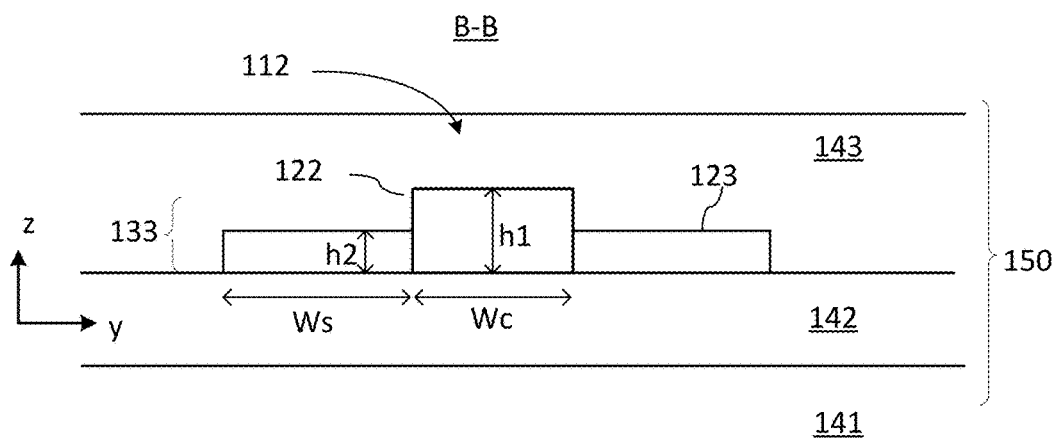
FIG. 3 is a schematic diagram of a partial cross-section of an input waveguide taper section of the waveguide polarizer of FIG. 1 in one embodiment thereof.
Figure 4:
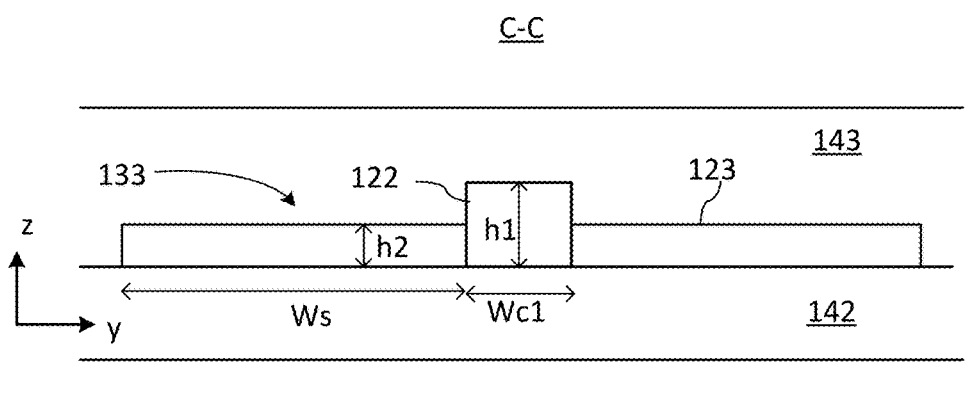
FIG. 4 is a schematic diagram of a partial cross-section of a mode squeezing waveguide section of the waveguide polarizer of FIG. 1 in one embodiment thereof.

Referring now also to FIGS. 2, 3, and 4 while continuing to refer to FIG. 1, in one embodiment the input waveguide 105 may be a ridge waveguide of height h1 and width Wc, while the MSE 110 may be in the form of a bi-level strip-loaded waveguide, which may also be referred to as the bi-level rib waveguide 110, wherein the core waveguiding region 122 in the form of a ridge or rib of height h1 is flanked on one or both sides by a slab waveguide of height h2<h1 defining the outer waveguiding region or regions 123. The outer waveguiding regions 123 may also be referred to herein as the slab waveguide 123. The first length portion 112 of the MSE 110, wherein the slab waveguide 123 widens while the width of the core waveguide 122 may remain the same, may also be referred to in this embodiment as the ridge-to-rib waveguide taper 112, while the second length portion 113 wherein the core waveguide 122 narrows may also be referred to as the rib waveguide taper 113. FIG. 2 shows a cross-sectional view of the input ridge waveguide 105 taken along the A-A line indicated in FIG. 1. FIGS. 3 and 4 show cross-sections of the bi-level strip-loaded waveguide 110 in the input taper section 114 and in the mode squeezing waveguide 116, which are taken along the lines B-B and C-C indicated in FIG. 1, respectively. FIG. 3 shows the cross-section of the ridge-to-rib waveguide taper 112, wherein the width Wc of the core 122 remains constant and matching the width of the input ridge waveguide 105, while the width Ws of the outer waveguiding portion 123 gradually widens. In the rib waveguide taper 113 the width Wc of the waveguiding core 122 gradually decreases to the smaller width Wc1 of the waveguide core in the squeezing waveguide 116, which cross-section is illustrated in FIG. 4.

In other embodiments, the input waveguide 105 may also be a bi-level rib waveguide, for example with an outer slab waveguide of a different height h3≠h2, with the first length portion 112 of the input taper 114 providing an adiabatic transition and mode matching between the input waveguide 105 and the rib waveguide taper 113.

Continuing to refer to FIGS. 1-4, the input ridge waveguide 105 and the bi-level rib waveguide 110 may be disposed in or upon the PIC chip 150 and formed, for example, by selectively etching to a desired depth a semiconductor or dielectric layer 133 that is disposed over a base layer 142. The base layer 142 has a lower index of refraction than the material of the core and outer waveguide regions 122, 123 of the rib waveguide 110, and serves as a lower cladding layer of the ridge or rib waveguide. The bi-level rib waveguide 110 may also be formed by a two-step selective deposition process of same or different materials that forms top and bottom layers of different width. In one embodiment, a top cladding layer 143 may be deposited over the rib waveguide 110. In another embodiment, the top layer 143 may be absent, with the upper cladding provided by air or another gas. In one embodiment the PIC chip 150 may be a silicon-on-insulator (SOI) chip 150, the layer 133 in which the core and outer waveguiding regions 122, 123 of the rib waveguide 110 is formed may be a silicon layer of the SOI chip 150, and the base layer 142 may be a layer of silicon dioxide (SiO2) disposed over a silicon substrate 141 of the SOI chip 150. The top cladding layer 143, when present, may be for example a layer of silicon dioxide, silicon nitride (Si3N4), polymer, or of any other suitable non-conducting material of a lower index of refraction than that of the waveguiding regions 122, 123. It will be appreciated that other material systems may also be used to form the bi-level rib waveguide 110.

In one embodiment, the first mode M1 may be the fundamental TE0 mode of the input ridge waveguide 105 having the highest effective index $n_{eff}$ and therefore the largest optical confinement in the waveguide core, with the TM0 mode and the higher-order TE modes TEn having lower effective indices than that of the TE0 mode. The narrowing down of the core waveguiding region 122 along the second length portion 113 of the input taper 114 squeezes the TM0 mode and the higher-order TEn modes out of the waveguide core 122 and into the outer waveguiding regions 123 to a significantly greater extent than the higher-effective index first mode TE0. The widths of the slab waveguide Ws and of the core waveguide Wc1 in the mode squeezing section 116 may be selected so that optical power of the first mode TE0 is confined substantially within the waveguide core 122, while the TM0 and TEn modes may have most of the mode power spread in the outer waveguiding regions 123 where the first mode TE0 is substantially absent or negligibly small, for example, no more than a few percent or tenth of a percent in power. Furthermore, the geometry of the input waveguide taper 114 may be configured so that light that enters the MSE 110 in a TM0 mode may be at least partially coupled into a higher-order TEn mode, such as TE1 and TE3, within a length of the ridge-to-rib waveguide taper 112, and is then squeezed out of the waveguide core 122 into the side region 123 as the waveguide core 122 becomes narrower in the rib waveguide taper 113. The TM→TE mode conversion of this type may be effected in the bi-level rib waveguide taper 110 at a specific width Ws=Wsc of the outer regions 123 due to its "vertically asymmetry", i.e. an asymmetry in the direction normal to the surface of the PIC wafer or layer upon which the waveguide 110 is formed, which is the z-axis direction in the example coordinate system illustrated in FIGS. 1-4. The TM0→TEn conversion in the ridge-to-rib waveguide taper 112 may facilitate the suppression of light that enters the polarizer in the TM0 mode, for example, in embodiments wherein the effective index of the TM0 mode is higher than that of the TE1 mode in the narrow-core squeezing waveguide 116.

Generally, the geometry of the input waveguide taper 114, which may be defined by the height parameters of the rib waveguide h1 and h2, the width Ws1 and Wc1 of the slab waveguide 123 and of the waveguide core 122 at the output end of the input taper 114, respectively, may be selected so that light 101 that enters the MSE 110 in the first mode having the greatest effective index in the input waveguide 105, such as for example the TE0 mode, remains largely confined within the waveguide core 122 at the output of the input taper section 114 and in the mode squeezing waveguide 116, while light 101 that enters the MSE 110 in the second mode having the lower effective index in the input waveguide 105, such as for example the TM0 mode or a TEn mode, largely loses its confinement within the waveguide core 122 by the time it reaches the mode squeezing waveguide 116. It may be preferable that the input taper section 114 is an adiabatic taper of a sufficiently long length, so that the change of its core width Wc and of the width of the outer waveguiding sections Ws happens smoothly over a length that is sufficient to prevent back reflections and to allow light that enters the input taper section 114 in the second mode, for example TM0, to couple into the higher-order modes and/or modes of the slab waveguide 123.

Generally the width and height parameters Wc, Wc1, Ws, h1, h2 of the rib waveguide 110 of the polarizer 100 in various sections may depend on the core and cladding materials of the waveguide and the target wavelength range of operation, and one skilled in the art will be able to determine suitable values using commercially available software for waveguide simulations and experimental verification. By way of example for the polarizer 100 that is formed in a h1=220 nm thick silicon layer of a SOI chip, the input waveguide width Wc may be in the range of 0.4 to 0.6 µm, the slab waveguide thickness h2 may be in the 50 to 160 nm range, and the core waveguide width Wc1 of the squeezing waveguide 116 may be down to 0.18 to 0.24 µm. The lengths of the ridge-to-rib waveguide taper 112 L1 and of the rib waveguide taper 113 L2 may be selected to provide an adiabatic transition between the input ridge waveguide 105 and the squeezing rib waveguide 116; for example, each of L1 and L2 may be about 10 µm or greater. The length of the squeezing rib waveguide 116 L3 may be selected to provide a desired level of suppression of the unwanted TM and TEn modes, and may also be for example about 10 µm or greater. The width Ws of the outer regions of the rib waveguide in a middle portion of the structure 100 may be for example 5 µm or greater.

Note that although the narrowing of the waveguide core 122 in the rib waveguide taper 113 and the widening of the slab waveguide 123 in the ridge-to-rib waveguide taper 112 is shown in FIG. 1 to be linear with device length in the direction of light propagation, it is by example only and in other embodiments the narrowing of the core waveguide 122 and/or the widening of the slab waveguide 123 may be non-linear with the distance along the direction of light propagation, and the input taper section 114 may be a multi-segmented and/or smooth taper, which exact shape in the plane (x,y) of the chip 150 may be determined by optimization.

In one embodiment, light 132 of the unwanted second mode, such as the TM0 and/or TEn, that is squeezed out of the waveguide core 122 in the squeezing waveguide 116, may be scattered away from the waveguide core 122 so that only at most a small portion of it is coupled back into the waveguide core by the outer taper 118; in some embodiments, such scattering may be sufficient to provide a desired level of suppression of the undesired modes at the output of the polarizer 100.

Figure 5:
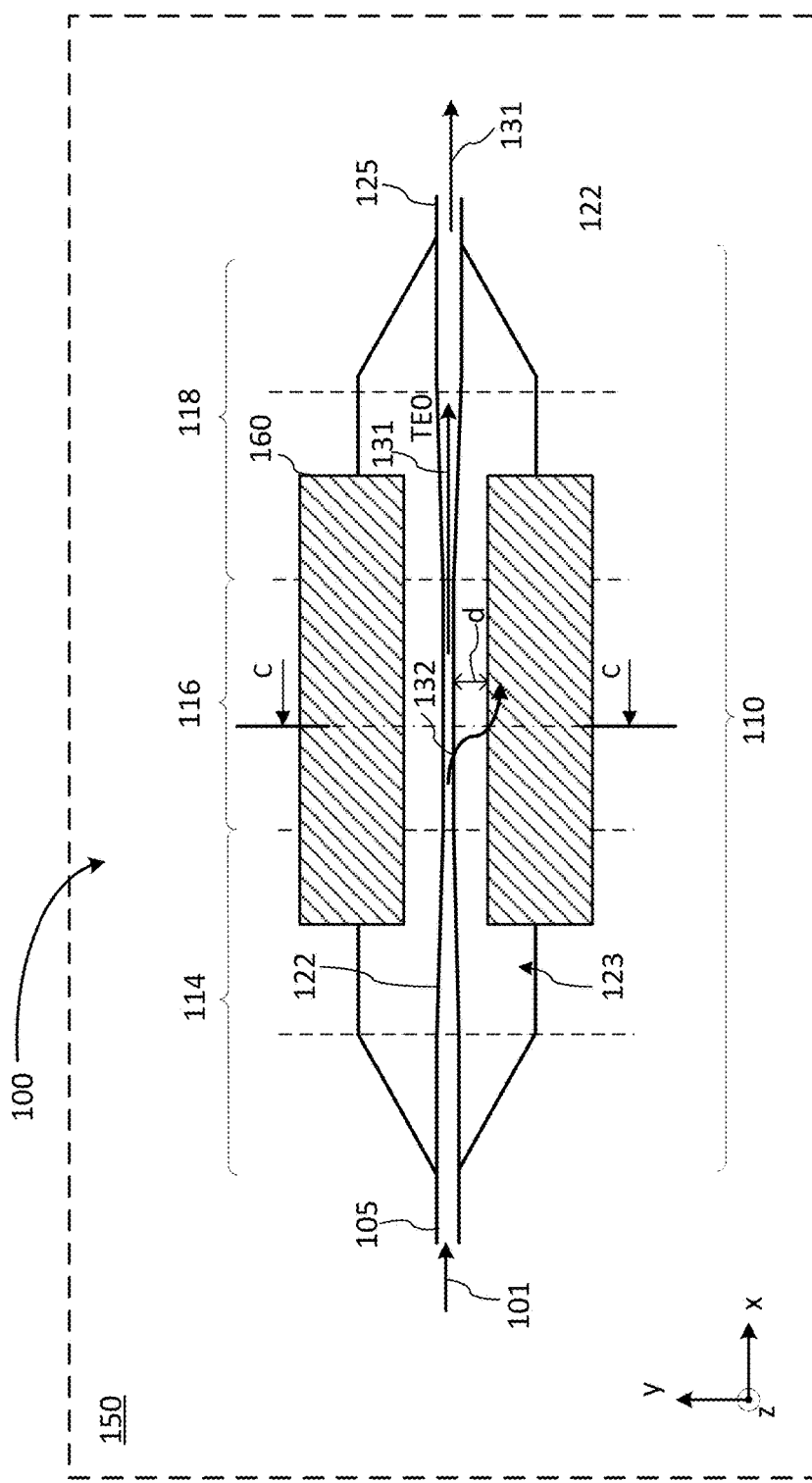
FIG. 5 is a schematic plan-view diagram of an embodiment of the polarizer of FIG. 1 incorporating an optical absorber/deflector in the outer waveguiding regions thereof.

Referring to FIG. 5, in some embodiments the MSE 110 may include a light absorber/deflector 160 that is configured to selectively absorb or deflect light propagating in the outer waveguiding region 123 thereof, and in particular in the outer waveguiding regions of the mode squeezing waveguide 116. Preferably, the light absorber/deflector 160 is located in a region of the MSE 110 which is substantially absent of the first mode TE0, at a distance d from the waveguide core 122 that exceeds the penetration depth of the first mode TE0 into the slab waveguide 123 within the mode squeezing waveguide 116; accordingly, the light 131 of the first mode TE0 can propagate in the waveguide core 122 substantially without attenuation by the light absorber/deflector 160. The light absorber/deflector 160 may be, for example, in the form of a metal layer coupled to the outer waveguiding region 123 of the MSE 110, a layer of light-absorbing semiconductor material coupled to the outer waveguiding region 123 of the MSE 110, or a doped region of a semiconductor layer forming the outer waveguiding region of the MSE 110. In other embodiments, the light absorber/deflector 160 may be an element that deflects light propagating in the slab waveguide 123 away from the waveguiding core 122, such as for example an optical grating or a light reflecting or deflecting grove that may be formed in the slab waveguide 123.

Figure 6:
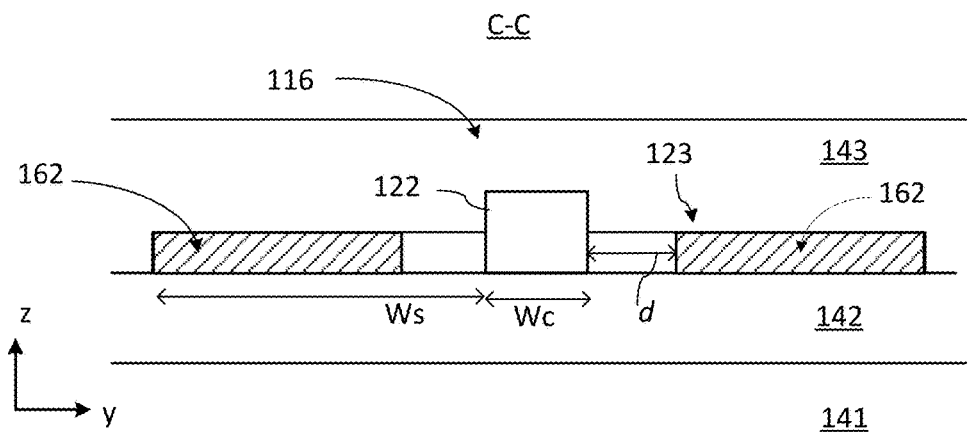
FIG. 6 is a schematic diagram of a partial cross-section along a C-C line of an embodiment of the waveguide polarizer of FIG. 5 including doped outer waveguiding regions.

With reference to FIG. 6, in one embodiment wherein the mode squeezing waveguide 116 is defined in a layer of a semiconductor material, such as for example the silicon layer of a SOI chip, the light absorber/deflector 160 may be in the form of a suitably doped region or regions 162 of the slab waveguide 123. A suitably high level of doping of the slab waveguide 123 may drastically increase the concentration of free carriers, i.e. electrons or holes, in the doped regions 162, thereby making it electrically conductive. The doped regions 162 formed in the portion of the slab waveguide 123 where the undesired TM or TEn light 132 penetrates will absorb the undesired light due to the free carrier absorption, thereby increasing the extinction ratio of the undesired light at the output of the polarizer. It will be appreciated that the doped regions 162 may be either n-doped or p-doped, and may be formed using well-developed in the art technologies, such as for example by selective diffusion or ion implantation of suitable dopants. By way of example the slab waveguide 123 may be made of silicon, and the doped region 162 may be a p++ region formed by selectively doping the silicon slab waveguide 123 with boron (B) to a doping concentration in the range of about $5 \cdot 10^{18} \text{-} 10^{20}$ cm$^{-3}$. The doped region 162 may be a n++ region formed by selectively doping the silicon slab waveguide 123 with phosphorus (Ph) to a doping concentration in the range of about $5 \cdot 10^{18} \text{-} 10^{20}$ cm$^{-3}$. It will be appreciated that other dopant materials and/or other doping levels may also be used.

Figure 7:
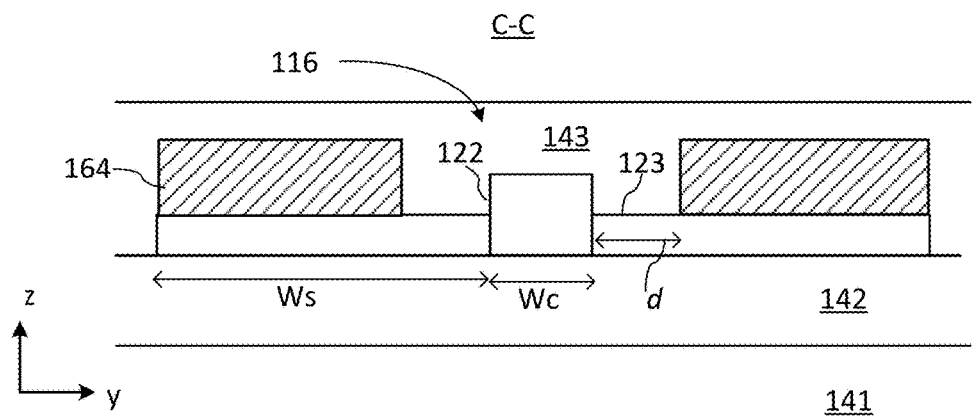
FIG. 7 is a schematic diagram of a partial cross-section along a C-C line of an embodiment of the waveguide polarizer of FIG. 5 including optical absorber disposed over outer waveguiding regions.

With reference to FIG. 7, in another embodiment the light absorber/deflector 160 may be in the form of a conducting layer or layers 164 that may be disposed upon the slab waveguide 123 at the suitable distance d from the waveguide core 122. The conducting layer or layers 164 may be, for example, a layer of a suitable metal, such as for example, Cu and/or Al and/or their alloy, or a layer of a semiconductor material that is not transparent at the wavelength λ to the input light 101. For example, in embodiments wherein the polarizer 100 is configured to operate in the 1.3-1.55 μm wavelength range, the slab waveguide 123 may be defined in a layer of undoped silicon, and the conducting layer or layers 164 may be a germanium (Ge) layer.

Figure 8:
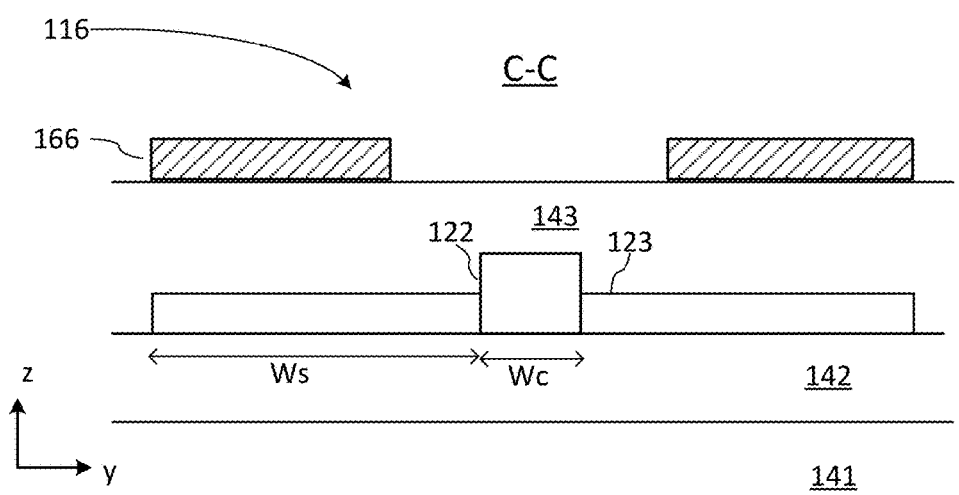
FIG. 8 is a schematic diagram of a partial cross-section along a C-C line of an embodiment of the waveguide polarizer of FIG. 5 including optical absorbing or waveguiding layers disposed over the upper cladding in the outer waveguiding regions.

With reference to FIG. 8, in another embodiment the light absorber/deflector 160 may be in the form of an auxiliary layer 166 that may be disposed upon the top cladding layer 143 over the slab waveguide 123 at a small distance therefrom so as to be optically coupled to the slab waveguide, but at a suitably large distance from the waveguide core 122 to prevent out-coupling thereto of the light 131 of the first, or desired, mode, e.g. the TE0 light. The auxiliary layer or layers 166 may be for example made of a light-absorbing material such as a suitable metal or a light-absorbing semiconductor, for example germanium. The auxiliary layer or layers 166 may also be a waveguiding layer wherein light propagating in the slab waveguide 123 may couple into, and which may be configured to guide that light away from the core waveguide 122 and from the polarizer's output. By way of example, the auxiliary layer 166 may be a layer of a dielectric or semiconductor material that has a greater index of refraction than that of the top cladding layer 143, such as for example Si, SiN, or SiON, among others.

Figure 9:
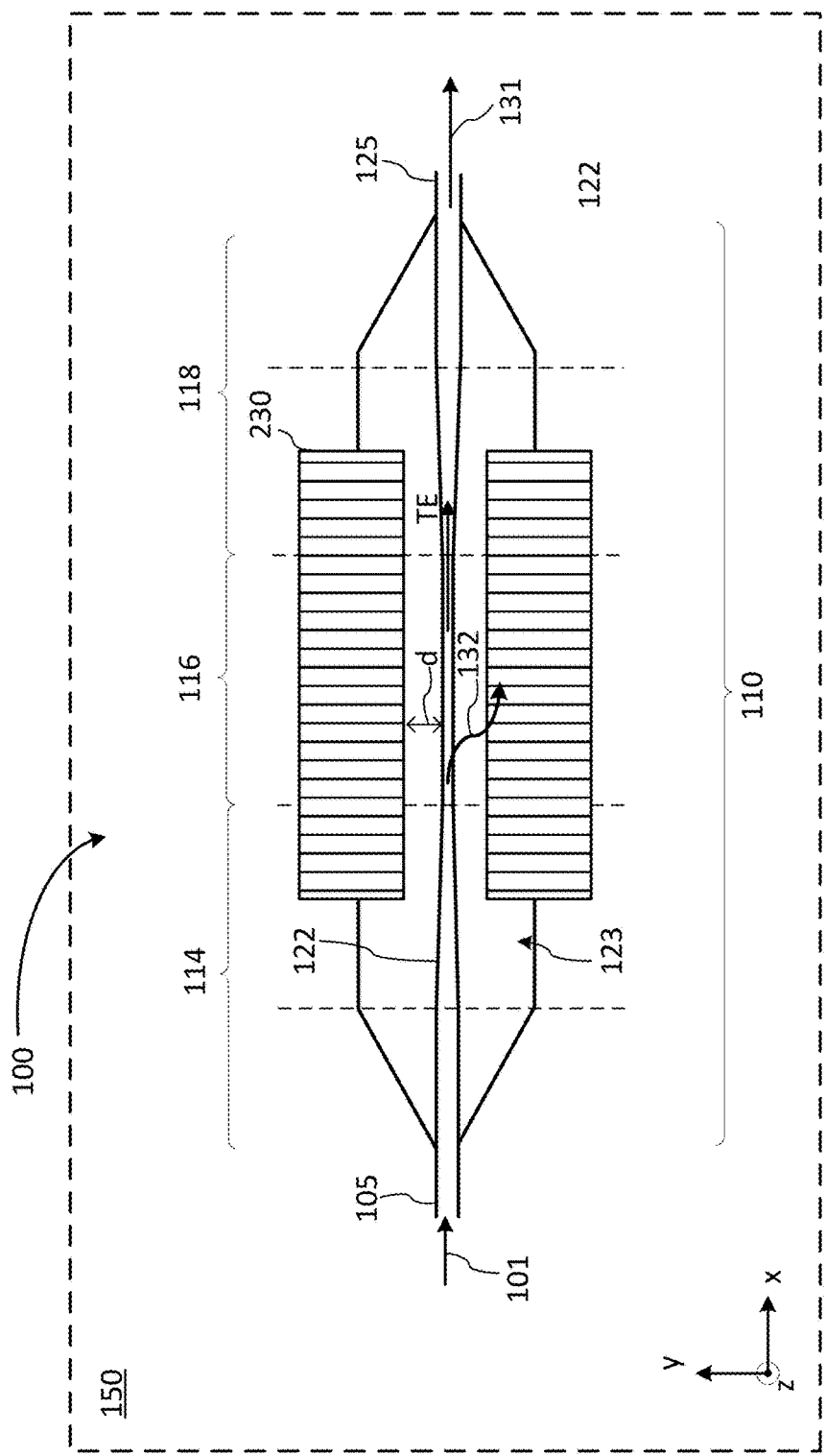
FIG. 9 is a schematic plan-view diagram of an embodiment of the polarizer of FIG. 5 incorporating a diffraction grating in the outer waveguiding regions thereof.

Referring now to FIG. 9, in one embodiment the light absorber/deflector 160 may be in the form of a diffraction grating 230 that may be formed, for example by etching, in the slab waveguide 123 or in the top cladding layer 143. The diffraction grating 230 may have a period selected to deflect the undesired light 132 of the undesired second mode or modes away from the waveguide core 122 and from the polarizer output 125. For example, the diffraction grating 230 may be a second-order grating designed to deflect light of the operating wavelength λ out of the PCI chip 150.

Figure 10A:
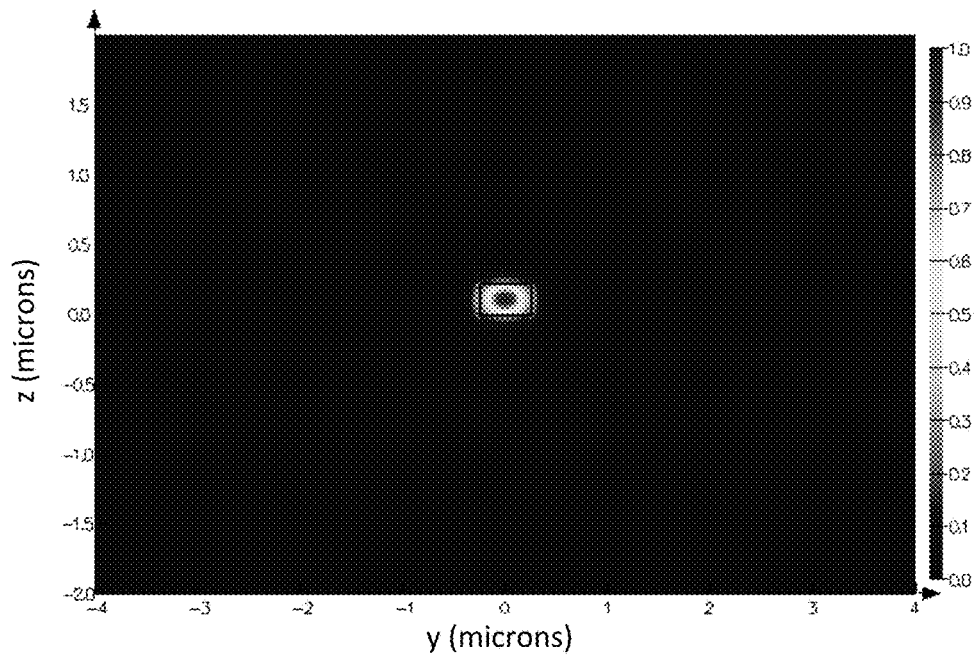
FIG. 10A is a graph showing a simulated two-dimensional (2D) distribution of the electric field (E-field) of a TE0 mode in an input optical waveguide of an example embodiment of the polarizer of FIG. 1, at cross-section (a) in FIG. 10D.
Figure 10B:
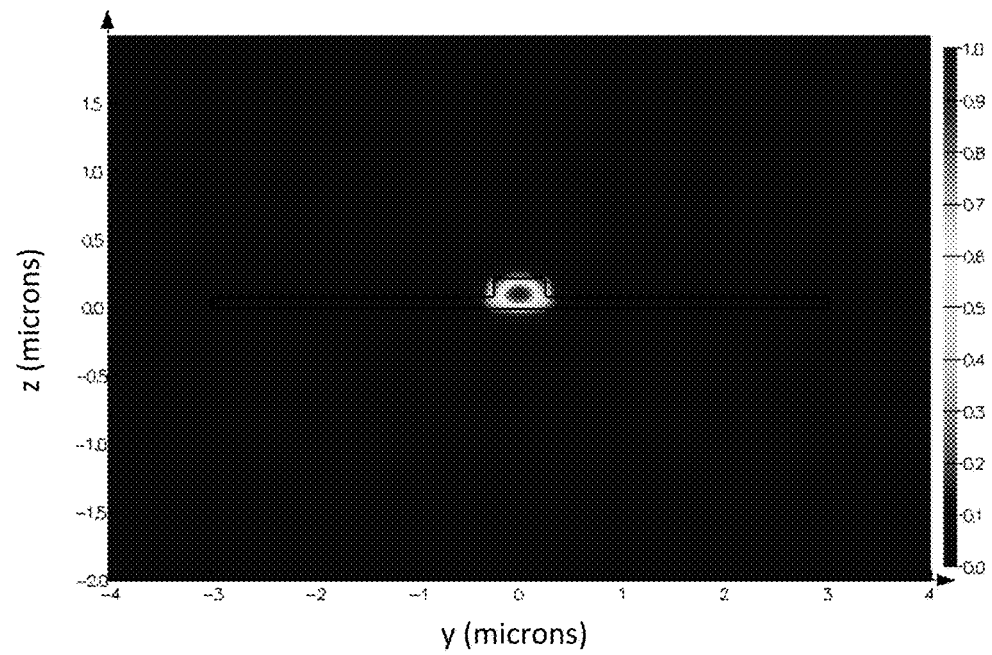
FIG. 10B is a graph showing a simulated 2D distribution of the E-field of the TE0 mode in an input rib waveguide taper of the example embodiment of the polarizer of FIG. 1, at cross-section (b) in FIG. 10D.
Figure 10C:
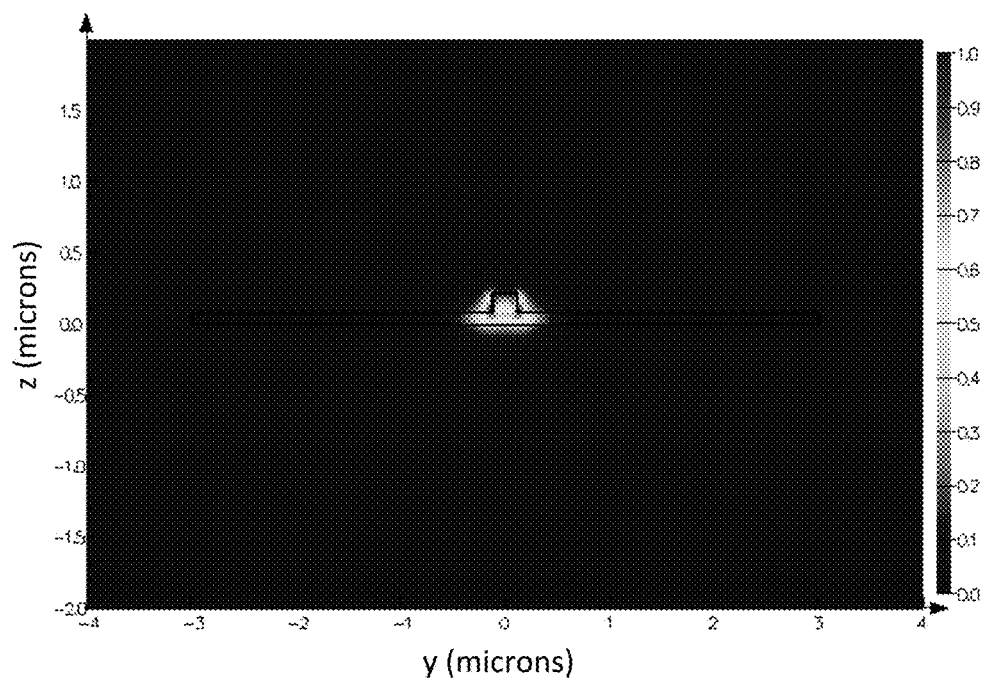
FIG. 10C is a graph showing a simulated 2D distribution of the E-field of the TE0 mode in the middle of the squeezing waveguide of the example embodiment of the polarizer of FIG. 1, at cross-section (c) in FIG. 10D.
Figure 10D:
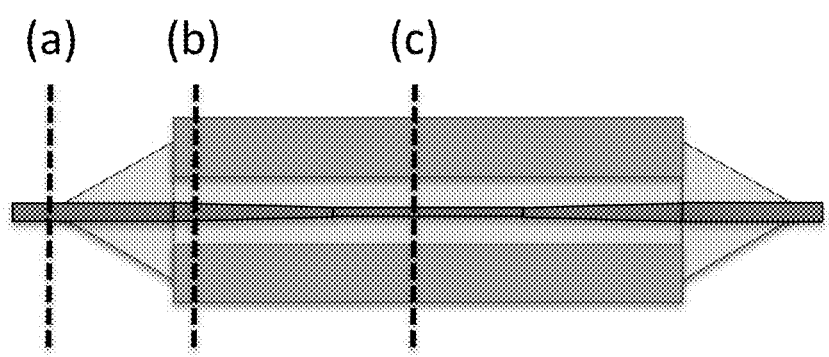
FIG. 10D is a schematic representation of the polarizer of FIG. 1 showing the locations (a), (b), and (c) at which the 2D E-field distributions illustrated in FIGS. 10A-C were computed.

With reference to FIGS. 10A-10D, simulated electrical field (E-field) profiles of propagating light at three different polarizer locations when input light 101 enters the polarizer 100 in the fundamental TE0 mode are illustrated in FIGS. 10A-10C, with the respective polarizer locations (a), (b), and (c) indicated in FIG. 10D. Simulations were performed for an example polarizer generally as illustrated in FIGS. 1-6 formed in the silicon layer of a SOI wafer, with SiOx lower and upper claddings and doped regions in the outer slab waveguide. The following device parameters were used in the simulations: Si layer thickness h1=220 nm, the slab waveguide thickness h2=90 nm, the width of the input ridge waveguide 105 Wc=500 nm, the width of the waveguide core in the squeezing waveguide, i.e. at location (c) in FIG. 10D, Wc1=220 nm. As can be clearly seen from the figures, at all three locations along the polarizer, the power of the TE0 mode is substantially confined in the ridge waveguide and does not penetrate into the slab waveguide more than a micron even where the waveguiding core is the narrowest, i.e. at location (c) shown in FIG. 10D. Accordingly, a light absorber/deflector 160 that is disposed at the distance from the waveguide core of about 0.6-0.7 microns or more will not attenuate the TE0 mode to any substantial degree.

Figure 11A:
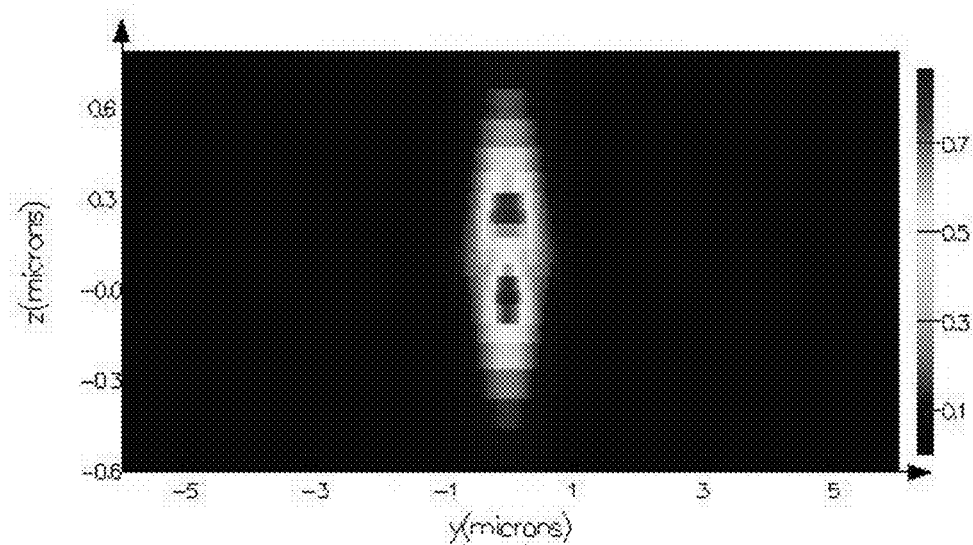
FIG. 11A is a graph showing a simulated 2D distribution of the E-field of light of an input TM0 mode in an input optical waveguide of the example embodiment of the polarizer of FIG. 1, at polarizer cross-section (a) in FIG. 11D.
Figure 11B:
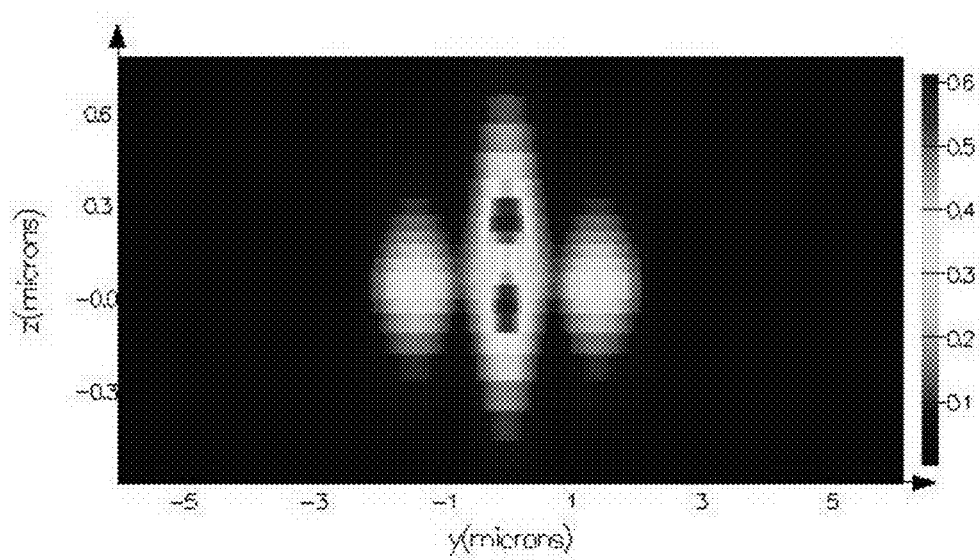
FIG. 11B is a graph showing a simulated 2D distribution of the E-field of the light of the input TM0 mode in the input ridge-to-rib waveguide taper of the example embodiment of the polarizer of FIG. 1, at polarizer cross-section (b) in FIG. 11D.
Figure 11C:
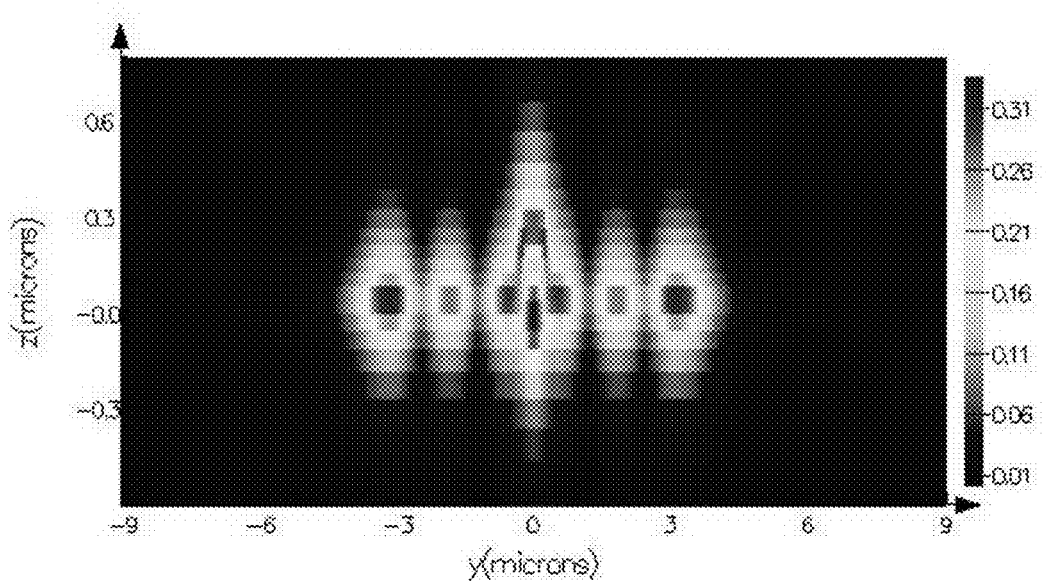
FIG. 11C is a graph showing a simulated 2D distribution of the E-field of the light of the input TM0 mode in the rib waveguide taper of the example embodiment of the polarizer of FIG. 1, at polarizer cross-section (c) in FIG. 11D.
Figure 11D:
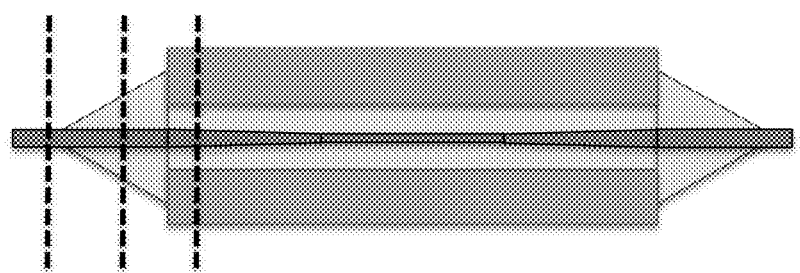
FIG. 11D is a schematic representation of the polarizer of FIG. 1 showing the locations (a), (b), and (c) at which the 2D E-field distributions illustrated in FIGS. 11A-C were computed.

Turning now to FIGS. 11A-11C, there are illustrated simulated E-field mode profiles when input light 101 is in the TM0 mode for the example polarizer as described hereinabove with reference to FIGS. 10A-10C, at polarizer locations (a), (b), and (c) indicated in FIG. 11D. As can be seen in FIGS. 11B and 11C, input light that enters the polarizer in the TM0 mode is largely converted to a higher-order mode or modes in the input waveguide taper where the slab waveguide widens and the waveguide core narrows. The coupling to higher-order modes of the slab waveguide starts in the ridge-to-rib taper, FIG. 11B and location (b), wherein the light is seen to spread to form secondary intensity maxima 1-2 microns away from the waveguide core. The narrowing of the waveguide core in the rib waveguide taper, FIG. 11C and location (d) indicated in FIG. 11D, leads to the input light largely or almost completely converted to higher-order modes in the slab waveguide, with light intensity spreading to about +\−4.5 μm away from the core waveguide axis, which corresponds to y=0 in FIGS. 10A-10C and 11A-11C.

As can be seen from FIGS. 10A-10C and 11A-11C, the E-field, and therefore the optical power, of the TE0 mode is substantially confined in the core waveguide along the whole length of the polarizer and does not penetrate into the slab waveguide more than by about half of a micron even where the waveguiding core is the narrowest, i.e. at location (c) in FIG. 10D. Accordingly, a light absorber/deflector 160 that is disposed at a distance from the waveguide core center of about 0.6-0.7 microns or more will not attenuate the TE0 mode to any substantial degree. However, the intensity of light that enters the polarizer in the TM0 mode is spread deep, by 1-4 microns in the shown example, into in the outer waveguiding regions of the input waveguide taper due to the narrowing of the waveguide core and the widening of the outer slab waveguide. Accordingly, a light absorber/deflector 160 that is disposed at the distance from the waveguide core center of about 0.7-1 μm with a width of 5-10 μm or more may significantly attenuate the undesired light that enters the polarizer in the TM0 mode.

Figure 12A:
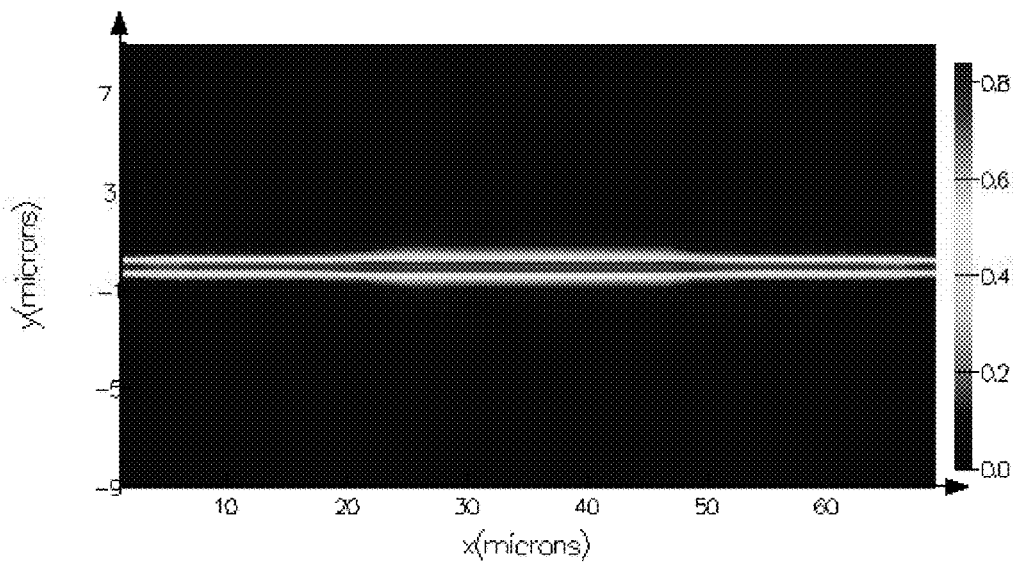
FIG. 12A is a 2D plot illustrating the evolution of an in-plane E-field profile along the length of the example polarizer of FIG. 5 with doped outer waveguiding regions, for input light in the TE0 mode.
Figure 12B:
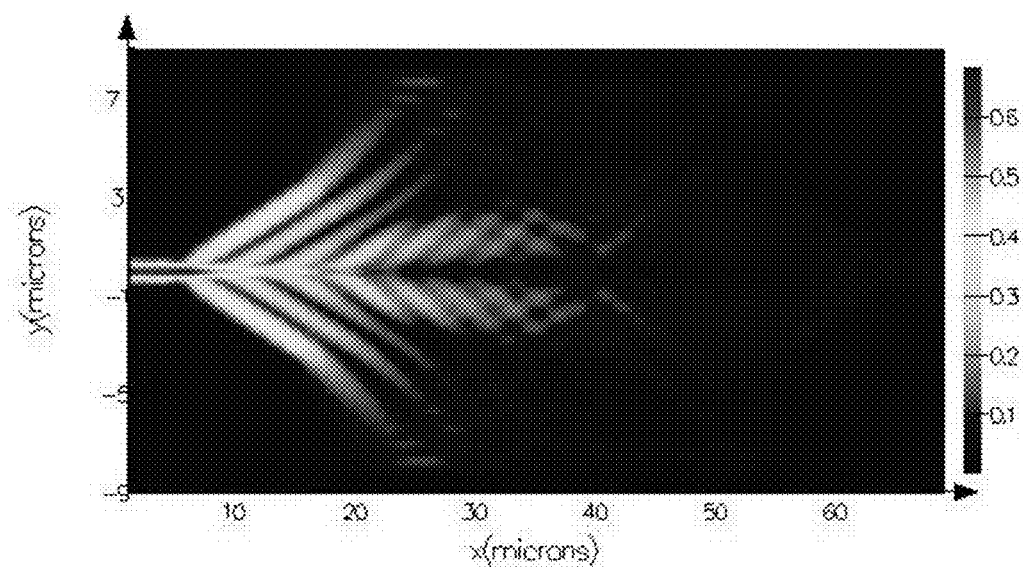
FIG. 12B is a 2D plot illustrating the evolution of an in-plane E-field profile along the length of the example polarizer of FIG. 5 with doped outer waveguiding regions, for input light in the TM0 mode.

With reference to FIGS. 12A and 12B, there are illustrated profiles of the light intensity along the polarizer length, in the plane of the PIC chip, which corresponds to the (x,y) plane in the (x,y,z) coordinate system indicated in FIGS. 1 and 5. The profiles were computed for the example polarizer as described hereinabove with reference to FIGS. 10A-10C, with doped regions in the slab waveguide located at a distance d=1.4 microns from the waveguide axis. FIG. 12A shows the evolution of the optical E-field profile along the polarizer length for light 101 that enters the polarizer in the TE0 mode, while FIG. 12B shows the evolution of the optical E-field profile along the polarizer length for light 101 that enters the polarizer in the TM0 mode. As can be clearly seen from FIG. 12A, for TE0 input the optical power is always concentrated in the core ridge waveguide. Contrary to that, light that enters the polarizer in the TM0 mode starts to couple to higher-order modes in the ridge-to-rib taper, which corresponds to the x-coordinate in the range of 7 to 17 microns in FIGS. 12A and 12B, with its power largely squeezed out of the core ridge and into higher-order modes of the outer waveguiding regions by the time it reached the middle of the squeezing waveguide, which corresponds to the x-coordinate in the range of 27 to 47 microns in FIGS. 12A and 12B. In the outer waveguiding regions 123 of the MSE 110, the light converted into the higher-order modes from the TM0 is attenuated to a negligibly low level due to the free carrier absorption in the doped regions of the slab waveguide, and substantially disappears without reaching the output waveguide (68 microns in FIG. 12A, B).

Figure 13A:
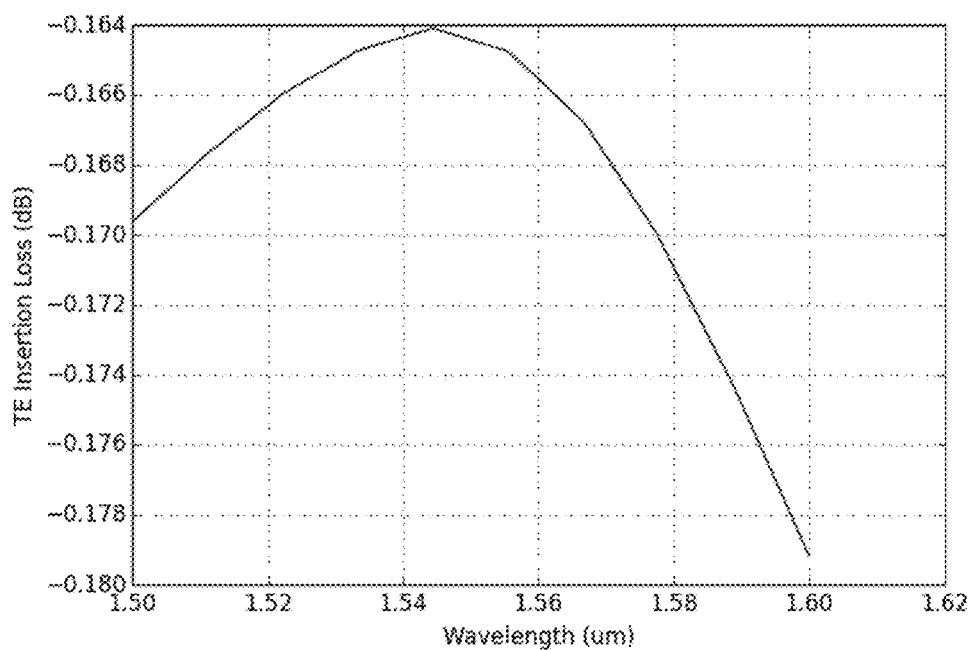
FIG. 13A is a graph showing simulation results for the wavelength dependence of an insertion loss for TE0 light of the example polarizer of FIG. 5 with doped outer waveguiding regions.
Figure 13B:
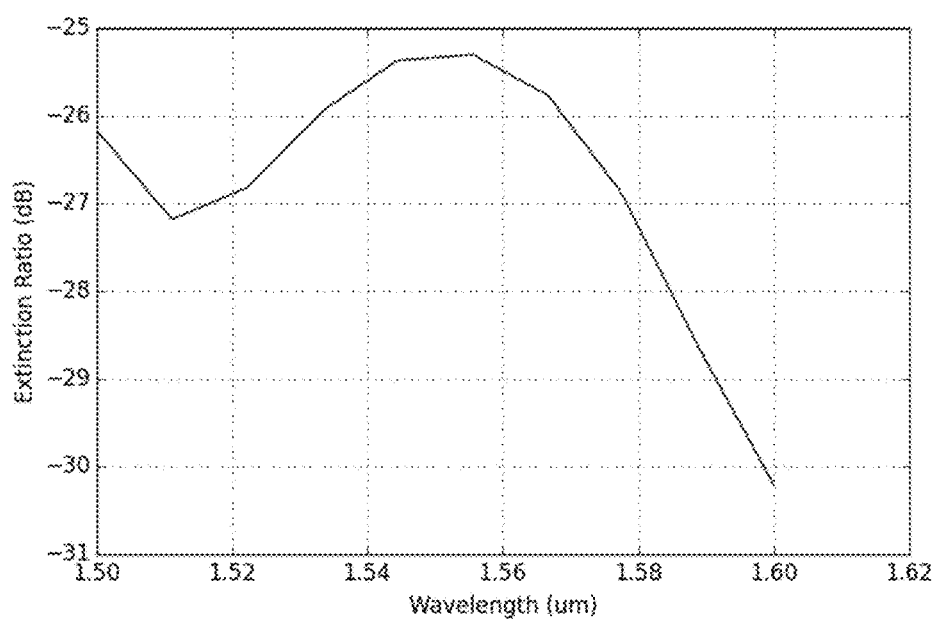
FIG. 13B is a graph showing simulation results for the wavelength dependence of the polarization extinction ratio at the output of the example polarizer of FIG. 5 with doped outer waveguiding regions.

Turning now to FIGS. 13A and 13B, there are illustrated simulation results for the wavelength dependence of the polarizer insertion loss for the TE0 mode (FIG. 13A) and the increase in the polarization extinction ratio at the polarizer output (FIG. 13B) for the example polarizer as described hereinabove with reference to FIGS. 10A-10C with highly doped outer waveguiding regions. The polarization extinction ratio ER of the polarizer, as illustrated in FIG. 13B, is defined as $ER=10 \cdot \log_{10}(P_{TE0}/P_{TM0})$, where $P_{TE0}$ and $P_{TM0}$ are the optical power of the TE0 mode and of the TM0 mode, respectively, at the output of the polarizer at equal optical power in the TE0 and TM0 modes at the polarizer input. As can be seen from the figures, the computed TE0 insertion loss stays below 0.2 dB across the C-band of the wavelength spectrum, i.e. from 1.5 to 1.6 μm, while the insertion loss for the TM0 mode exceed 25 dB across the C-band, corresponding to an increase of the TM/TE extinction ratio at the polarizer output by at least 25 dB. The extinction ratio performance can be further improved, for example by making the slab region of the rib waveguide wider and making the device longer.

Figure 14:
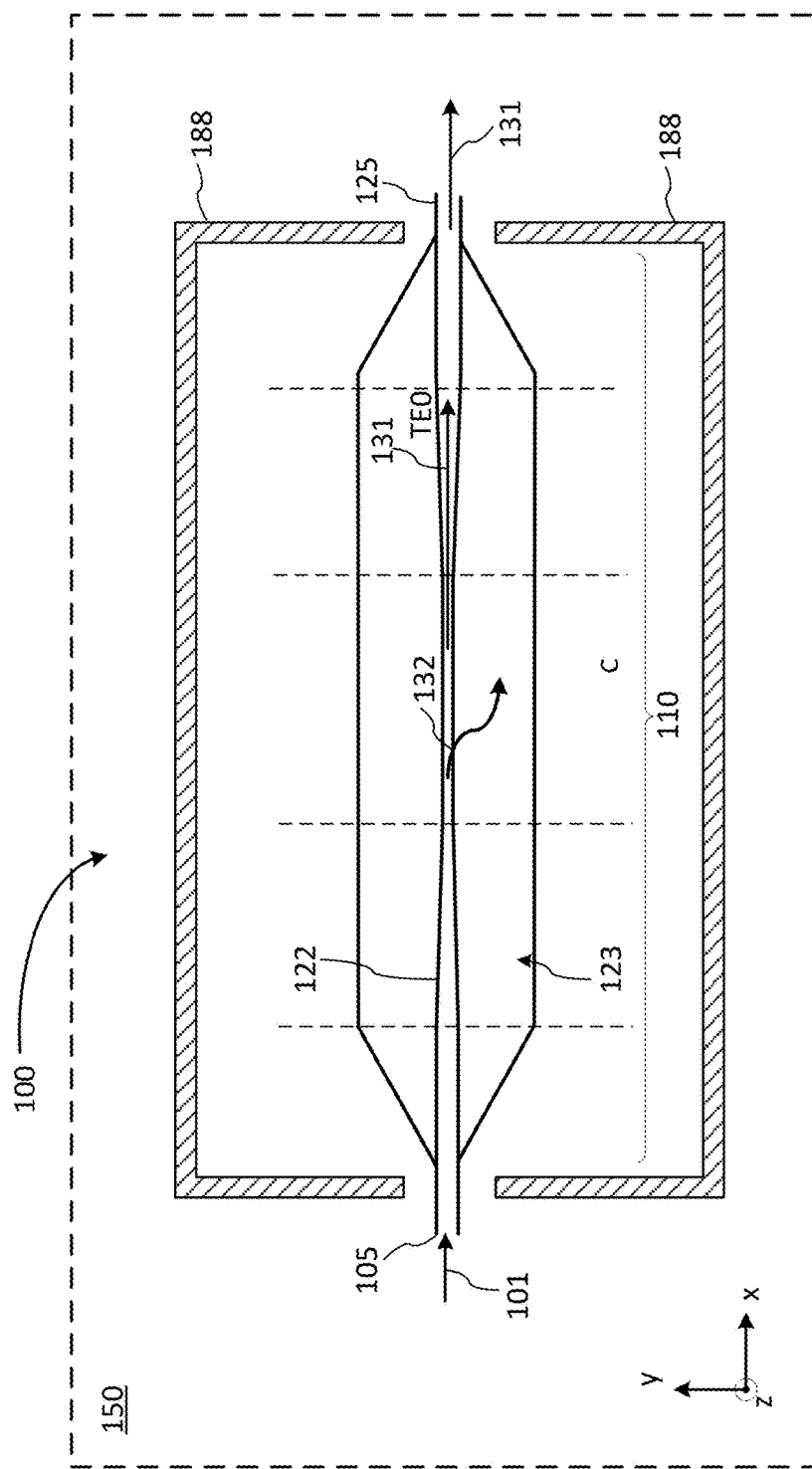
FIG. 14 is a schematic plan-view diagram of an embodiment of the polarizer of FIG. 1 incorporating an optical shielding.

Turning now to FIG. 14, in one embodiment the integrated waveguide polarizer 100 may include a shield 188 surrounding the MSE 110 so as to block or absorb light 132 of the undesired second mode or modes that is spread or scattered into the outer waveguiding regions 123 from leaking into other optical devices that may be present in the PIC chip 150, and also to block scattered light from other optical devices from coupling into the polarizer. The shield 188 may be, for example, in the form of a wall of a light absorbing material, such as metal or semiconductor, for example Germanium. Such a wall may be formed, for example, in a via formed in the upper cladding layer 143 and, possibly, in the lower cladding layer 142 illustrated in FIGS. 2-4 and 6-7. Alternatively, the shield 188 may be, for example, in the form of a trench formed in the cladding layers. Various embodiments of the shield 188 are described in a co-pending patent application entitled "Shielded Photonic Integrated Circuit," which is assigned to the assignee of the present application. In some embodiments, the shield 188 may be used as the light absorber/deflector 160 described hereinabove to absorb scattered light of the undesired second mode or modes and to prevent it from coupling into the output waveguide 125 of the polarizer 100. In some embodiments, the shield 188 may be disposed only at one side of the MSE 110, for example when no optical devices or sources of scattered light are present at another side thereof.

It will be appreciated that principles and approaches described hereinabove with reference to the example embodiments, and in particular with reference to squeezing out from a waveguide core and dumping a TM0 mode of input light while allowing light of a TE0 mode to propagate, may also be applicable to filtering out other undesired modes while preserving a desired mode or modes, by selectively squeezing out and dumping the undesired higher order mode. Accordingly, an aspect of the present disclosure provides a method of polarization and/or mode filtering, in a PIC chip comprising an optical waveguide supporting first and second modes. The method may comprise: a) receiving light comprising first and second modes into a mode-selective expander (MSE) waveguide that comprises a core waveguiding region and an outer waveguiding region; and, b) using the MSE waveguide to preferentially expand the light of the second mode from the core waveguiding region into the outer waveguiding region, and to propagate the first mode along the core waveguiding region for coupling into an output waveguide, so that the outer waveguiding region remains substantially absent of the first mode.

In one embodiment of the method, the first mode may be a highest effective index mode of the input waveguide, and the second mode may be any other mode having a lower effective than that of the first more. In one embodiment, the first mode may be a TE mode, and the second mode may be a TM mode. For example, the first mode may be TE0 and the second mode may be TM0. In one embodiment, the first mode may be a TM0 mode and the second mode may be a TE0 mode. In one embodiment, the first mode may be a highest effective index mode of the input waveguide, for example the TE0 mode, and the second mode may be a mode having a second highest effective, for example the TM0 mode. Note that in all such embodiments the integrated waveguide polarizer 100 described hereinabove operates substantially as a mode filter that is configured to block all modes other than the highest-index one, since the mode squeezing waveguide section that is configured to eliminate the mode with the second highest effective index will also eliminate all higher-order TE and TM modes that pass the input taper section 114. Embodiments wherein the highest effective index mode is a TM0 mode may also be envisioned, as may be defined by the waveguide geometry.

Embodiments described hereinabove provide an integrated on-chip polarizer that may be fabricated for example in silicon or other layer of a SOI wafer, in a way that is compatible with a CMOS fabrication process. Advantageously, such a polarizer may have ultralow loss for a desired mode, e.g. on the order or less than 0.2 dB for a TE0 mode, and a high extinction ratio, e.g. in excess of 25 dB for the undesired mode, such as e.g. the TM0 mode. Furthermore, optical polarizers or mode filters constructed using principles and methods described herein may be used to filter and or polarized light with wavelengths lying in various wavelength ranges, including but not limited to the telecommunication wavelength ranges known as the O-band, E band, S band C band, L band, and U band, which together span from about 1260 nm to about 1675 nm.

Low-loss high-efficiency waveguide polarizers that can be integrated within a PIC, including but not limited to those described hereinabove, may be advantageously used to suppress spectral and intensity noise that is associated with polarization and/or mode cross-coupling in a PIC, such as for example due to mode scattering on waveguide irregularities that may be occurring within long optical waveguide interconnects. For example, the integrated waveguide polarizer 100 may be incorporated in a PIC in conjunction with an integrated optical device such as a photodetector, an optical modulator, an Echelle grating, an MMI coupler, a routing waveguide, an integrated laser source, etc. For example, polarizer 100 may be disposed at an input port of an integrated photodetector, modulator, MMI coupler, or Echelle grating, so as to filter out an undesired mode or modes, e.g. the TM0 mode. Similarly, it may be incorporated at the output of an integrated laser source, MIMI coupler, or Echelle grating. In some embodiments, one or more waveguide polarizers may be inserted along the length of a long waveguide interconnect in a PIC. In some PIC embodiments, long waveguide interconnects may be required to route light between two optical waveguides or ports that are comparatively far from each other in the PIC. In some cases such waveguide interconnects may be made wider and multimode in order to reduce optical loss. In many cases, such waveguides are fed substantially with polarized light, so that most if not all of the light may be concentrated in the TE0 mode at the input. However, scattering on waveguide non-idealities may lead to mode and polarization conversion in such waveguides, when some of the TE0 light gets scattered into other modes, causing polarization or mode cross-coupling that may lead to undesirable noise at the receiving device.

Figure 15:
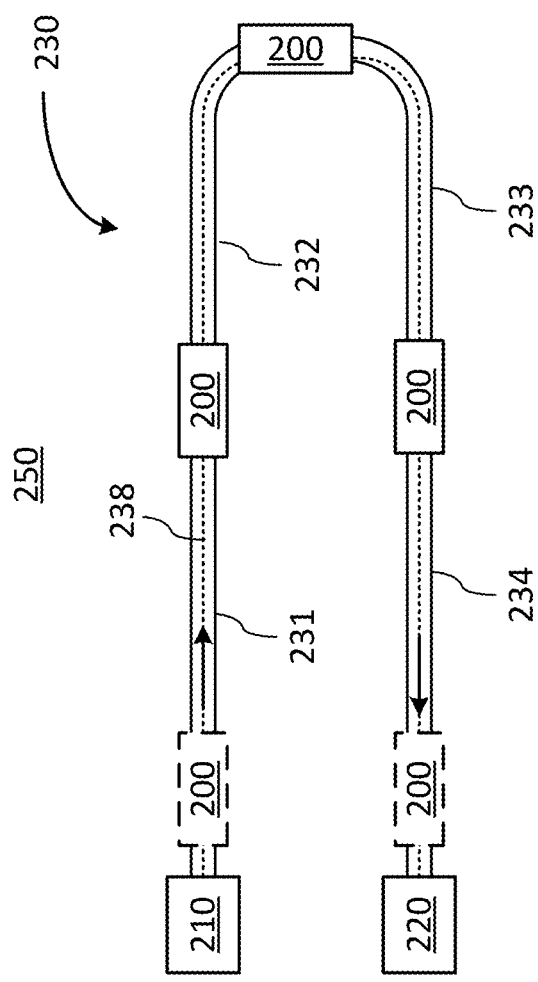
FIG. 15 is a schematic plan-view diagram of a photonic integrated circuit with an optical waveguide interconnect incorporating integrated waveguide polarizers or mode filters for suppressing signal noise due to polarization mode cross-coupling.

Referring to FIG. 15, there is illustrated a PIC 250 including an optical waveguide interconnect (OWI) 230 that is configured to provide an optical connection between a first optical device 210 and a second optical device 220. The first optical device 210 may be, for example, an integrated laser source, a waveguide modulator, a waveguide coupler, or any other optical device configured to transmit an optical signal and which may be integrated in a PIC chip. The second optical device 220 may be, for example, a photodetector, a waveguide modulator, a waveguide coupler, or any other optical device configured to receive an optical signal and which may be integrated in a PIC chip. In one embodiment, one or both of the first and second optical devices 210, 220 may be an optical port for coupling to an external chip or device. The OWI 230 includes integrated waveguide polarizers 200, each of which configured to suppress light propagating in the optical waveguide interconnect in an undersized polarization mode, for example TM0, so as to reduce polarization crosstalk downstream from the integrated waveguide polarizers 200. In one embodiment the polarizers 200 may be inserted within OWI 230 at regular intervals so as to avoid long lengths of routing waveguides without a polarizer. Waveguide polarizers may be for example in the form of the waveguide polarizer 100 described hereinabove with reference to FIGS. 1-6 but may also be different waveguide polarizers that are configured to strip light passing therethrough form an undesired mode or modes, such as for example TM0 mode and higher-order TEn modes. Although five polarizers 200 are shown in FIG. 15, it will be appreciated that in other embodiments fewer or greater number of polarizers may be used, in dependence upon the total length of the waveguide interconnect and PIC design considerations. Thus, in one embodiment OWI 230 may be in the form of, or include, a chain of two or more polarizers 200 directly connected to each other in series by routing waveguides, such as waveguide sections 231, 232, 233, and 234 illustrated in FIG. 15. Polarizers 200 that are disposed in the routing path 238 of the OWI 250 next to the optical devices 210, 220 and indicated in the figure by dashed blocks serve to clean-up light the optical signal from undesired mode or modes as it is being transmitted by the first optical device 210 or received by the second optical device 220; these polarizers may be omitted in some embodiments depending on the optical devices used and system design tolerances.

The placement of the polarizers within the PIC may be determined at the stage of the PIC design in accordance with a pre-defined rule or an algorithm, for example so as to ensure the absence of polarizer-free routing links in the PIC that are longer than a pre-defined maximum length Lmax. The exact value of Lmax may vary in dependence upon particular PIC requirements, parameters of the routing waveguides, presence of other integrated optical devices in the link, etc. It may be determined, for example, so as to ensure that the mode and/or polarization extinction ratio ER of an optical signal stays below a pre-defined maximum value ERmax as the optical signal propagates in the PIC, so as to reduce signal noise due to mode and/or polarization cross-coupling to a system-acceptable level. Such a rule or a set of rules may be incorporated in PIC layout software so as to provide an automatic placement of optical polarizers in a PIC at the stage of the PIC layout design.

Accordingly, an example method of designing a photonic integrated circuit (PIC) chip may include the following steps: a) determining a routing path in the PIC chip for an optical waveguide interconnect that is configured for routing optical signals between optical elements; and b) disposing one or more waveguide polarizers along the routing path so that a maximum length of a contiguous section of the optical waveguide interconnect without a waveguide polarizer does not exceed a predefined maximum length Lmax. In the example embodiment of FIG. 15, the 'routing path' is designated by a dotted line 238 and is the path defined by the waveguides 231-234.

In one embodiment the maximum routing waveguide length Lmax may be determined in dependence upon one or more waveguide parameters, such as for example waveguide width. In one embodiment, steps a) and b) may be performed automatically using a computer executing software instructions for implementing said steps. Techniques and approaches for incorporating corresponding polarizer placement rules as software instructions into existing or newly developed computer programs for PIC layout design will be apparent to those skilled in the art on the basis of the present disclosure.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings. Thus, such other embodiments and modifications are intended to fall within the scope of the present disclosure. For example, it will be appreciated that semiconductor materials other than silicon, including but not limited to compound semiconductor materials of groups commonly referred to as A3B5 and A2B4, such as GaAs, InP, and their alloys and compounds, may be used to fabricate the integrated waveguide polarizers example embodiments of which are described hereinabove. In another example, although example embodiments described hereinabove may have been described primarily with reference to polarizers or mode filters that are configured to block a fundamental TM mode while letting a fundamental TE mode to pass through, it will be appreciated that principles and device configurations described hereinabove with reference to specific examples may be adopted to squeeze out and eliminate any waveguide mode or group of modes of a lower effective index than a desired waveguide mode that is to be passed through by the polarizer, by suitably configuring the waveguide geometry of the MSE waveguide 110. For example, embodiments may be envisioned wherein a TM0 mode enters the polarizer with a greater effective index than the TE0 mode, for example depending on the geometry of the input waveguide, in which case the first, or desired, mode M1 may be the TM0 mode, the second, or undesired, mode M2 may be the TE0 mode or a higher-order TM or TE mode. Furthermore, although in the example embodiments described hereinabove the MSE waveguide 110 is shown to be substantially straight, in other embodiments it may include one or more waveguide bends, for example but not exclusively in the mode squeezing waveguide section 116, which may further facilitate leaking of the undesired mode light out of the waveguide core and into the slab waveguide, wherein it can be attenuated or diverted away from the output waveguide. Furthermore although in the example embodiments described herein the MSE waveguide 110 is in the form of a bi-level strip-loaded or rib waveguide, multi-level implementations thereof may also be envisioned, and are within the scope of the present disclosure.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A waveguide polarizer, comprising:
   an input optical waveguide capable of supporting a first mode and a second mode;
   an output optical waveguide; and
   a mode-selective expander (MSE) extending optically between the input and output optical waveguides and comprising:
   a core waveguiding region disposed to receive light of the first mode and light of the second mode from the input optical waveguide, and
   an outer waveguiding region disposed alongside the core waveguiding region in optical communication therewith,
   wherein at least one of the core waveguiding region and the outer waveguiding region are configured to preferentially expand the light of the second mode from the core waveguiding region into the outer waveguiding region, and to propagate the light of the first mode along the core waveguiding region, while being substantially confined within said core waveguiding region, for coupling into the output optical waveguide, with the outer waveguiding region remaining substantially absent of the light of the first mode;
   wherein the MSE comprises an input taper section wherein the outer waveguiding region gradually widens in a direction of light propagation, and the core waveguiding region gradually narrows in the direction of light propagation.

2. The waveguide polarizer of claim 1 wherein the outer waveguiding region is configured to attenuate light of the second mode expanded thereinto while allowing light of the first mode to propagate along the core waveguiding region substantially undisturbed.

3. The waveguide polarizer of claim 2 wherein the MSE comprises a light absorber configured to selectively absorb light propagating in the outer waveguiding region thereof.

4. The waveguide polarizer of claim 3 wherein the light absorber comprises one of: a metal layer coupled to the outer waveguiding region of the MSE, a layer of light-absorbing semiconductor material coupled to the outer waveguiding region of the MSE, and a doped region of a semiconductor layer forming the outer waveguiding region of the MSE.

5. The waveguide polarizer of claim 2 wherein the MSE comprises a light redirecting element configured to selectively re-direct light propagating in the outer waveguiding region thereof away from the output optical waveguide.

6. The waveguide polarizer of claim 5 wherein the light redirecting element comprises one of: an optical grating formed in the outer waveguiding region or optically coupled therewith, and an auxiliary waveguiding layer optically coupled to the outer waveguiding region of the MSE so as to re-direct light propagating therein away from the core waveguiding region of the MSE.

7. The waveguide polarizer of claim 1 wherein the outer waveguiding region is greater in width than the input optical waveguide, and wherein the core waveguiding region of the MSE is smaller in width than the input optical waveguide along at least a portion of the MSE.

8. The waveguide polarizer of claim 7 wherein the MSE comprises a strip-loaded waveguide defined by the core waveguiding region and the outer waveguiding region, the strip-loaded waveguide comprising a layer of a semiconductor or dielectric material disposed on a support substrate, wherein said layer is thinner in the outer waveguiding region than in the core waveguiding region.

9. The waveguide polarizer of claim 8 wherein the first mode is a fundamental TE mode and the second mode is a TM mode or a higher-order TE mode, wherein the strip-loaded waveguide comprises the input taper section.

10. The waveguide polarizer of claim 9 comprising a support substrate, wherein the strip-loaded waveguide is disposed upon the support substrate.

11. The waveguide polarizer of claim 10 wherein the support substrate comprises a silicon-on-isolator wafer comprising a silicon layer, and wherein the strip-loaded waveguide is defined in the silicon layer.

12. The waveguide polarizer of claim 1 wherein the outer waveguiding region gradually widens along a first length of the input taper section, and the core waveguiding region gradually narrows along a second length of the input taper section following the first length in the direction of light propagation.

13. The waveguide polarizer of claim 1 including an optical shielding disposed beside the MSE so as to prevent light of the second mode to couple into an external optical device and/or so as to shield the MSE from external light.

14. The waveguide polarizer of claim 1, wherein the first mode is characterized by a greater effective refractive index in the MSE than the second mode.

15. The waveguide polarizer of claim 14, wherein the first mode is a TE0 mode and the second mode is one of: a TM0 mode, and a higher-order TE or TM mode.

16. The waveguide polarizer of claim 14, wherein the first mode is a TM0 mode and the second mode is one of: a TE0 mode, and a higher-order TE or TM mode.

17. The waveguide polarizer of claim 1 wherein the MSE comprises an output taper section wherein the outer waveguiding region gradually narrows towards the output waveguide and the core waveguiding region gradually widens towards the output waveguide.

18. The waveguide polarizer of claim 1 wherein the MSE further comprises a mode squeezing section disposed to receive light from the input taper section, wherein the core waveguiding region in the mode squeezing section is smaller in width than the input optical waveguide.

19. A photonic integrated circuit (PIC) chip comprising:
an optical waveguide interconnect disposed to provide an optical connection between a first optical device and a second optical device and comprising one or more integrated waveguide polarizers of claim 1, each configured to suppress light propagating in the optical waveguide interconnect in the second mode while passing through light in the first mode, so as to reduce mode crosstalk downstream from the one or more integrated on-chip polarizers.

* * * * *